United States Patent [19]
DiGregorio et al.

[11] Patent Number: 5,234,595
[45] Date of Patent: Aug. 10, 1993

[54] TWO-PHASE ORBITAL-TYPE WASTEWATER TREATMENT SYSTEM AND METHOD

[75] Inventors: David DiGregorio, Salt Lake City; David T. Berry, Sandy, both of Utah

[73] Assignee: Baker Hughes Incorporated, Houston, Tex.

[21] Appl. No.: 917,557

[22] Filed: Jul. 21, 1992

[51] Int. Cl.⁵ .............................................. C02F 3/14
[52] U.S. Cl. ..................................... 210/605; 210/607; 210/629; 210/194; 210/253; 210/903; 210/926
[58] Field of Search ............... 210/605, 607, 629, 630, 210/194, 195.1, 253, 202, 903, 926

[56] References Cited

U.S. PATENT DOCUMENTS

| | | | |
|---|---|---|---|
| 3,510,110 | 5/1970 | Klein | 210/926 |
| 3,701,727 | 10/1972 | Kormanik | 210/629 |
| 4,159,243 | 6/1979 | Okey | 210/926 |
| 4,285,818 | 8/1981 | Muskal | 210/629 |
| 4,303,516 | 12/1981 | Stensel et al. | 210/219 |
| 4,383,922 | 5/1983 | Beard | 210/521 |
| 4,446,018 | 5/1984 | Cerwick | 210/195 |
| 4,543,185 | 9/1985 | Reid | 210/194 |
| 4,818,391 | 4/1989 | Love | 210/195 |
| 4,869,818 | 9/1989 | DiGregorio | 210/194 |
| 4,975,197 | 12/1990 | Wittmann et al. | 210/926 |

FOREIGN PATENT DOCUMENTS

| | | |
|---|---|---|
| 3002604 | 7/1981 | Fed. Rep. of Germany . |
| 0252366 | 12/1987 | German Democratic Rep. . |
| 8301500A | 4/1983 | Netherlands . |

Primary Examiner—Christopher Upton
Attorney, Agent, or Firm—Skjerven, Morrill, MacPherson, Franklin & Friel

[57] ABSTRACT

A wastewater orbital treatment system includes an elongated racetrack-like tank containing a central partition wall. A surface aerator is mounted adjacent to at least one end of the partition wall to both aerate and propel the mixed liquor including biomass around the orbital tank. An aerobic zone for BOD and ammonia oxidation is provided in an upper layer of the moving volume of mixed liquor and an anoxic zone for reduction of $NO_x$ from the aerobic zone, by anoxic respiration by the biomass, is provided in a lower layer of the moving volume of mixed liquor. An imperforate horizontal baffle is provided under the surface aerator so as to prevent dissolved oxygen in the aerobic zone from entering the anoxic zone. The $NO_x$ from the aerobic zone is introduced through a free interface of the two vertically displaced zones downstream of the baffle. In a preferred embodiment a radial impeller connected by a common drive shaft to the surface aerator is positioned below the baffle and aids in propelling the anoxic zone layer around the circuit.

22 Claims, 2 Drawing Sheets

TWO-PHASE ORBITAL-TYPE WASTEWATER TREATMENT SYSTEM AND METHOD

FIELD OF THE INVENTION

This invention relates to an orbital-type wastewater treatment system utilizing activated sludge. More particularly, it relates to an improved system and method in which mixed liquor being propelled around an orbital essentially closed circuit tank is subject to two-phase treatment in the orbital tank.

BACKGROUND OF THE INVENTION

An early circa 1960 installation by Pasveer for waste water, i.e., primarily sewage, purification by the activated biological sludge included a closed circuit or ditch with a motor-driven horizontally-rotated brush used for adding needed oxygen (air) to the sewage and moving the sewage in circulation. In U.S. Pat. No. 3,510,110, an orbital system employing an elongated tank with central partition was disclosed which employed a vertically-rotated surface aerator located at the end(s) of the partition wall for both aerating the sewage and circulating the sewage around the channels formed by the partition wall and the sides of the tank.

This latter system has had great commercial success with over 500 plants in operation world-wide (ranging from less than 1 MGD capacity to one of over 10 million population equivalent) with over 250 plants in operation or in various construction phases since 1976 in the United States up to the present time. Sold under the trademark Carrousel ®, the high popularity of the system is due primarily to its cost-effectiveness, simplicity of design, ease of operation and maintenance, and excellent effluent quality. It can treat raw domestic water to EPA advanced secondary standards without primary clarifiers or effluent filters. With extended aeration, it produces a highly stable water sludge requiring little or no further processing prior to disposal. Carrousel ® systems can be designed to have a power turn-down of 50-75%. Aerator drive horsepower can be varied from 100% of installed capacity to as little as 25% without loss of mixing and continuing sufficient mixed liquor channel velocity. This power down flexibility provides an ability to closely match oxygen input to the mixed liquor to oxygen demand of the microbes acting to degrade the sewage, without loss of mixing and movement.

In U.S. Pat. No. 4,869,818 a radial flow high efficiency submerged impeller is added to the same shaft as drives the surface aerator so that mixed liquor in the lower portion of the orbital channels is pumped in the same direction as that mixed liquor pumped by the surface aerator. This effectively alleviates certain depth restrictions in orbital tanks resulting in deeper channels requiring inter alia less concrete and less land space.

Various prior art wastewater treatment systems and methods employ a first reaction vessel where a mixture of wastewater and micro-organisms which "feed" on the organic material in the wastewater in the presence of air or oxygen from an aerator, are aerobically treated. A portion of the mixed liquor is then processed in a second clarifier vessel under anoxic conditions. The first reaction vessel may be of the orbital-type such as a Carrousel ® system.

U.S. Pat. Nos. 4,303,516 (Stensel et al.) and 4,818,391 show the incorporation of a clarifier within the orbital tank, the latter showing the formation of an aerobic zone along one part of the orbital path, an upstream aerator and an anoxic zone downstream of the aerobic zone (FIG. 16). In the '391 patent FIGS. 1-12 show a large rectangular tank including a rectangular reaction vessel and a rectangular clarifier in communication with one another. As the oxygen supplied by the aeration device is consumed in the aerobic zone, the reaction become anaerobic, i.e., anoxic in the downstream anoxic zone. The micro-organisms then utilize the oxygen bound in the nitrates ($NO_2$ and $NO_3$ compounds) formed in the aerobic zone, to reduce the nitrates to nitrogen in the anoxic zone for release to the atmosphere as a gas. The mixed liquor then enters the downstream clarifier. Clarified liquor is removed while the settling biological solids are returned directly (recycled) to the main flow of mixed liquor travelling through and around the orbital path.

Devices shown in U.S. Pat. Nos. 4,303,516, 4,446,018, 4,818,391 and 4,383,922 involve interchannel clarifiers and except as noted above do not suggest or discuss a separate anoxic zone.

U.S Pat. No. 4,543,185 discusses the use of a barrier downstream of an aerator in an orbital ditch for preventing stratification of aerated liquor in the ditch top and unaerated liquor flow near the ditch bottom. The '185 patent also discloses detoxification employing alternating aerobic-anoxic sequences of stages without intermediate clarification, to effect nitrogen removal, i.e., denitrification. U.S. Pat. No. 4,159,243 (Okey) also discloses the use of an anoxic zone in an orbital channel, downstream from the aerobic zone, for de-nitrification. Netherlands Patent No. 8301-500-A discloses an orbital channel by-pass which provides alternate nitrification and denitrification.

SUMMARY OF THE INVENTION

The present invention is directed to the creation of an aerobic zone in an upper vertical portion or layer of the volume of a mixed liquor flowing in an orbital channel adjacent to an aeration means, and an anoxic zone in a lower vertical portion or layer of that volume of mixed liquor. The aerobic zone is separated from the anoxic zone by a horizontal baffle between the zones at a position adjacent the aeration means. Two relatively distinct layers of mixed liquor are provided, namely, an upper aerobic layer and a bottom anoxic layer. The baffle creates the two-phase (aerobic phase/anoxic phase) at the impeller or aeration end of the orbital basin. Subsequent controlled phase intermixing is provided as the mixed liquor flow proceeds around the orbital pathway. The upper zone is aerobic, allowing for BOD (biochemical oxygen demand) and ammonia oxidation by aerobic respiration by the biomass. A positive dissolved oxygen (DO) concentration is present in the aerobic zone. The lower zone is anoxic, allowing for nitrate reduction by anoxic respiration by the biomass. Since $NO_x$ compounds such as nitrites and nitrates are the end product of ammonia oxidation in the aerobic zone, some downstream intermixing of the upper and lower zones is necessary allowing sufficient quantities of produced $NO_x$ from the upper zone to be transferred to the lower zone, while preventing excessive intermixing, particularly of dissolved oxygen (DO) from the upper zone to the lower zone which would render the lower anoxic zone aerobic. Under controlled operation the mixed liquor DO immediately upstream of the aeration means will approach or be zero in the mixed liquor.

That portion of the orbital pathway containing mixed liquor with essentially zero DO and a positive $NO_x$ content is anoxic. Generally the operation of the treatment system will result in anoxic conditions in the mixed liquor located below the elevation of the horizontal baffle both under the baffle and along a mixed liquor layer above the channel bottom downstream of the baffle. In this anoxic zone, $NO_x$ is reduced to nitrogen gas as the biomass consumes BOD. The BOD may be either from that remaining in the mixed liquor exiting the aerobic zone and downwardly intermixing with the lower downstream anoxic zone or from direct injection of BOD-containing influent wastewater into the anoxic zone.

The imperforate horizontal baffle which is placed under the aeration means prevents intermixing of the vertically displaced aerobic and anoxic zones to prevent large quantities of DO from being transferred to the anoxic mixed liquor. The baffle extends downstream for a distance sufficient enough to allow the turbulence generated by the aerator to subside thereby limiting intermixing. However, some intermixing of the zones downstream of the baffle must occur so that $NO_x$ produced in the upper aerobic zone is transferred to the anoxic zone in order for the reduction of $NO_x$ to take place. Further, once the $NO_x$ is reduced in the anoxic zone, intermixing of the zones is necessary to transfer any remaining $NO_x$ and $N_2$ out of the anoxic zone for discharge through migration across the zone interface.

In a preferred embodiment a radial impeller is provided spaced below a surface aerator, both being attached for rotary movement with a common vertical shaft, as shown in U.S. Pat. No. 4,869,818. The radial impeller is vertically positioned under the horizontal baffle so that the radial impeller provides an additional horizontal propelling force for the stratified mixed liquor forming the lower anoxic zone. In this embodiment the respective surface aerator and radial impeller coact with the end of the orbital pathway partition wall to effectively move the aerobic layer and the anoxic layer of mixed liquor essentially in separate layers around the orbital tank.

DETAILED DESCRIPTION

Figure 1:
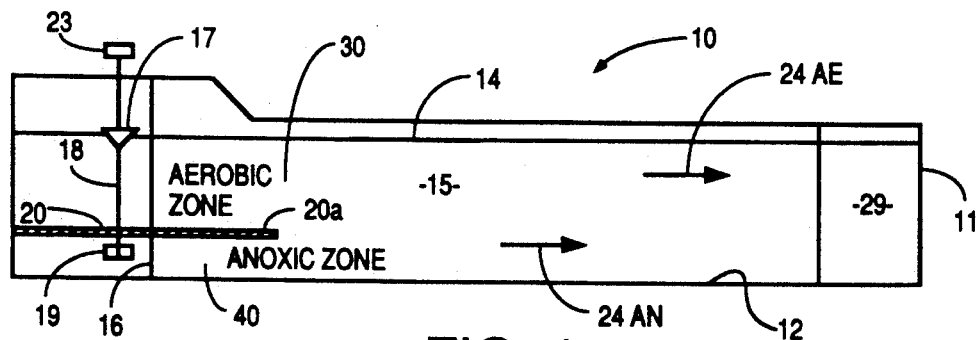
FIG. 1 is a schematic cross-sectional view of an orbital oxidation ditch taken on the line 1—1 of FIG. 2.
Figure 2:
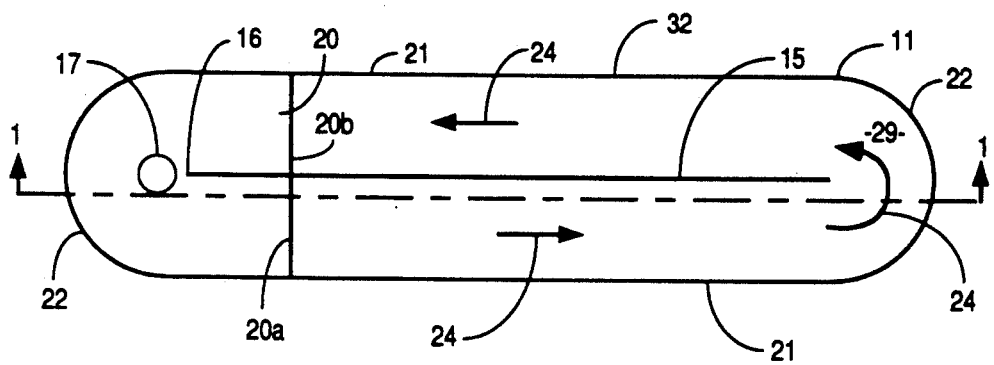
FIG. 2 is a schematic plan view thereof.

As shown schematically in FIGS. 1 and 2, a two-phase orbital system 10 includes an elongated tank or ditch 11 generally having a tank bottom 12, two parallel connected channels formed by a pair of parallel vertical side walls 21 and curved flow-turning vertical end walls 22. A vertical central partition 15 extends parallel to the side walls to a position short of the end walls 22 forming an orbital closed-loop tank. This results in curved end passageways 29 for mixed liquor flowing through tank 11. In this preferred embodiment an aeration means, in the form of an upper surface aerator 17 connected by common shaft 18 to a propulsor in the form of a lower radial impeller 19 or propeller, provides a motive force to convey a plug flow of the mixed liquor around the orbital pathways in a racetrack-like configuration. Motor 23 (FIG. 3) rotatively drives the aerator means. The surface aerator 17 also functions to oxygenate and aerate the mixed liquor of wastewater and activated sludge. A suitable motorized weir (not shown) functions to control the level 14 of the mixed liquor in the tank 11 and to remove mixed liquor as desired. Residence times of 24 hours are common with the wastewater making dozens of cycles around the overall circuit. Influent enters the system through pipe 32 upstream of the surface aerator 17. Each orbital tank is normally custom designed based on individual design parameters, such as influent quantity and characteristics, desired effluent concentration levels, site size and shape, population and industries served and to-be-served. The shape of the circuit can be oval as illustrated or be in the form of looped or circular orbits with multiple aerators. It is also contemplated that in the case of multiple aerators, a separate imperforate horizontal baffle will be provided under each aerator. For example, a surface aerator and baffle may be placed at both ends of partition 15.

In the present invention the mixed liquor flow is divided into two vertical treatment zones, namely an upper aerobic zone 30 and a lower anoxic zone 40 which flow around the circuit as essentially separate stratified layers. An imperforate horizontal baffle 20 divides the two zones vertically in the vicinity of the aerator(s) 17 so that dissolved oxygen (DO) resultant from the aeration of the wastewater does not enter the lower anoxic zone. The horizontal baffle is attached to one of the end walls 22 and extends to a position inboard of the end 16 of central partition 15 so that the baffle, between end wall 22 and straight baffle ends 20a and 20b extending across both parallel channels of the orbital ditch, inhibits or essentially prevents DO from reaching anoxic zone 40. While the baffle has been referred to as being "imperforate," the shaft 18 does extend through a baffle aperture. The aperture may contain a rotary seal (not shown) or the shaft-to-aperture clearance may be so small as to inhibit DO from entering into the anoxic zone.

As is known in Carrousel ® installations and other surface aeration systems the peripheral edges of the surface aerator 17 and radial impeller 19 are slightly spaced from the partition end 16 so as to prevent short-circuiting of the mixed liquor being swirled by the surface aerator. The surface aerator preferably provides about a one foot (30.5 cm)/second and about a 0.5 ft (15.25 cm)/sec. mixed liquor flow velocity, respectively, in the aerobic and anoxic circuit channels. U.S. Pat. No. 4,869,818 teaches an appropriate sizing and spacing of the surface aerator and radial impeller. The aerobic zone 30 extends primarily above baffle 20 but the mixed liquor in that zone continues to flow as an upper layer denoted by arrow 24AE around the channels to be reintroduced to the action of the surface aerator 17 for additional aeration. While the upper flowing zone may stay in an aerobic condition all the way back to the aerator, it may convert to an anoxic environment part way down the channel(s) once the dissolved oxygen is depleted essentially to zero. Likewise the anoxic zone 40 extends primarily under baffle 20 and continues to flow (in the absence of DO from the aerobic zone intermixing therewith), to reduce $NO_x$ compounds, for example, $NO_2$ and $NO_3$ to nitrogen gas. This on-going anoxic zone flow is denoted by arrow 24AN. The anoxic zone continues throughout the downstream channels except to the extent that some DO migrates to that zone through the interface.

Figure 3:
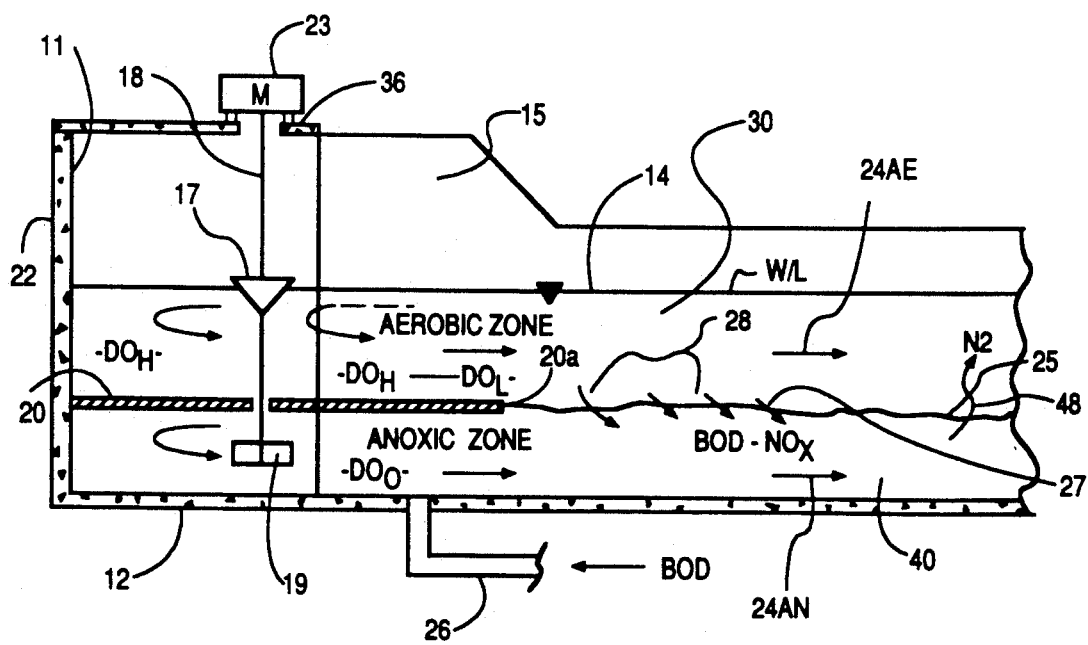
FIG. 3 is a more detailed cross-sectional view showing the aerobic and anoxic zones and the intermixing of compounds in the orbital ditch of FIG. 1.

FIG. 3 illustrates more clearly the dissolved oxygen levels in the aerobic zone extending from high concentrations $DO_H$ in the amounts of 2-3 mg/l to low or zero concentrations $DO_L$ or $DO_0$ in the amounts of from about 0.5 to zero mg/l. In the aerobic zone, the biomass consumes this oxygen to oxidize ammonia to $NO_x$ compounds. By the time an aerated plug of mixed liquor flows along the orbital channel well downstream of the aeration means, the DO is so low ($DO_L$ or $DO_0$) that the downstream horizontal free interface 25 (beyond the edge 20a of baffle 20) between the vertical zones, does not include DO which otherwise would change the characteristics of the anoxic zone.

However, some of the $NO_x$ compounds (arrow 28) formed in the aerobic zone will tend to migrate by intermixing across the free interface 25 into the anoxic zone 40. The extent of intermixing is determined by the distance which baffle 20 extends upstream and downstream of aeration device 17 and the degree of turbulence at interface 25. The introduced $NO_x$ is then reduced to nitrogen gas in the anoxic zone as the activated sludge consumes BOD. The nitrogen gas so generated raises across the free interface as illustrated by arrow 48 for release at the basin water surface. Further, BOD from the aerobic zone (arrow 27) also can migrate into the anoxic zone as necessary for $NO_x$ reduction or can be supplied directly to the anoxic zone by a feed line 26 in or adjacent to the tank bottom 12. Tank 11 is shown as a concrete tank which may be above ground level or wholly or partially buried. Access to the aerator and motor can be by walkway 36.

In FIGS. 1-3 the horizontal baffle is shown as extending to an upstream end 20b and to a downstream end 20a each displaced from aerator 17. Horizontal baffle 20 may extend further around the orbital ditch or be discontinuous, as long as excessive intermixing of dissolved oxygen (generally by aerator turbulence) from the upper zone to the lower anaerobic zone is prevented. When the DO concentration has diminished sufficiently at a point downstream of the baffle end 21a, sufficient quantities of produced $NO_x$ are transferred from the upper aerobic zone to the lower anoxic zone at a position downstream of baffle end 21a. Multiple downstream baffle sections may be provided downstream of baffle end 21a to prevent excessive intermixing with a gap(s) between subsequent baffle section(s) to allow $NO_x$ transfer and $N_2$ release. Downstream baffle sections in channel locations having very low or zero DO may include openings allowing $NO_x$ transfer and $N_2$ release. In a preferred embodiment an imperforate horizontal baffle extends equally over a downstream and upstream distance from the aerator 17 over a total distance from about 20% to about 50% of the overall length of the elongated tank, as measured between end walls 22 along center partition 15.

Figure 4:
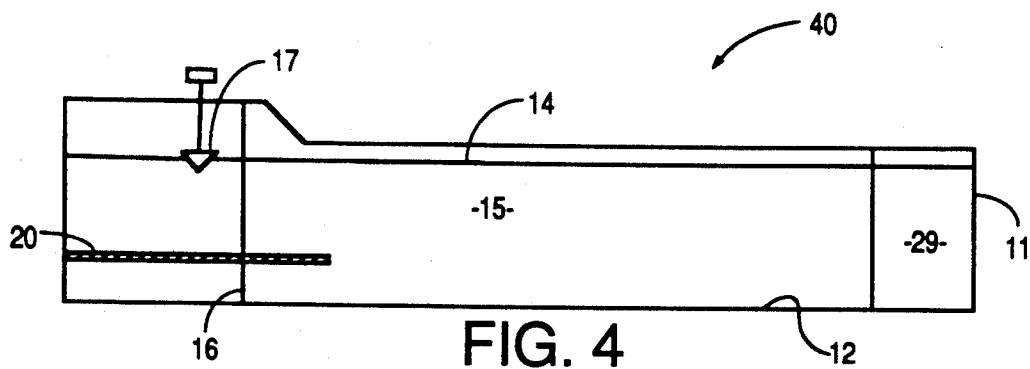
FIG. 4 is a cross-sectional view of a second embodiment of the orbital ditch.

FIG. 4 is directed to a system 40 in which a surface aerator 17 is employed alone. The surface aerator 17 is designed in size and horsepower so that sufficient propelling force is present to move both the upper aerobic zone layer and the lower anoxic zone layer around the circuit without silting of the tank bottom 12 with mixed liquor solids. The aerator operation provides a frictional interlayer interface drag (induced flow) between the aerobic zone layer and the anoxic zone layer thus functioning as the means for moving the anoxic layer around the circuit. A surface aerator such as a Model 350 of 100 H.P. manufactured by EIMCO of Salt Lake City, Utah would be used in a typical installation such as shown in FIG. 2 for a 15,000 P.E. (population equivalent) installation, incorporating a 4 m. deep, 100 m. long and 16 m. wide ditch with a 85 m. long central partition.

Figure 5:
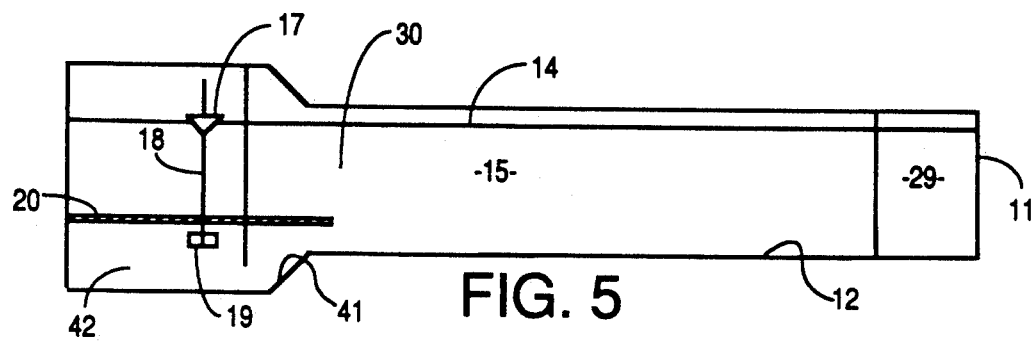
FIG. 5 is a cross-sectional view of a third embodiment of the orbital ditch.

FIG. 5 is an additional embodiment including a depression or sump 42 formed by depending sloped bottom wall sections 41 located in the tank bottom 12 in both parallel channels. The sump 42 functions to increase the volume and detention time of the anoxic biomass in the basin. It also reduces flow velocity and head loss as the anoxic biomass flows under the horizontal baffle. A sump under the baffle 20 and below the level of the tank bottom 12 can also be included in the FIG. 4 embodiment.

Figure 6:
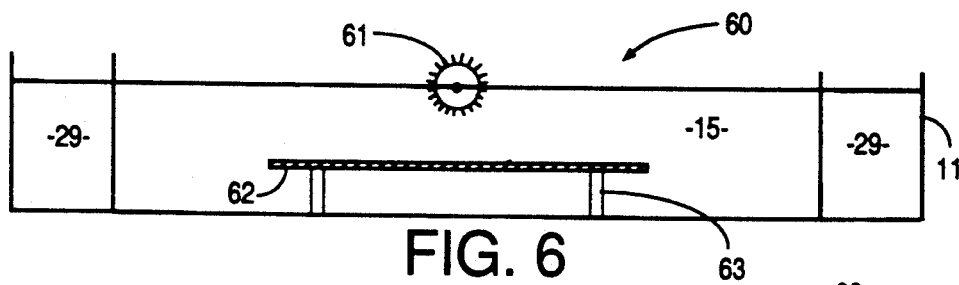
FIG. 6 is a cross-sectional view of a fourth embodiment taken on line 6—6 of FIG. 7.
Figure 7:
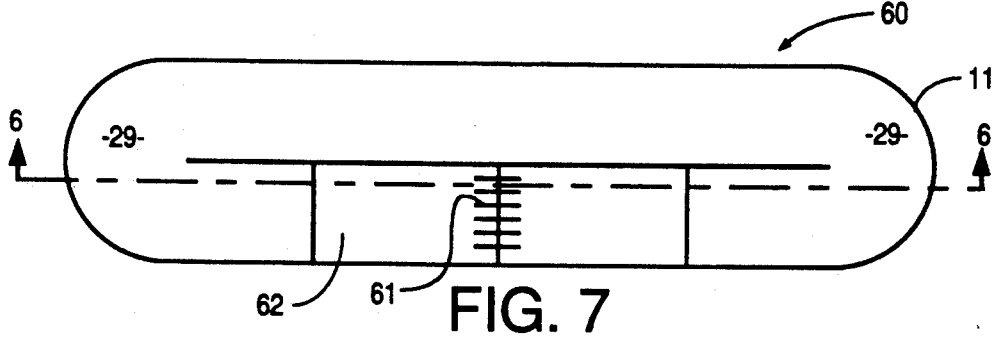
FIG. 7 is a plan view of the fourth embodiment.

FIGS. 6 and 7 illustrate the use of the invention in another embodiment. This system 60 uses a different aerator means, namely a so-called horizontal brush aerator 61 placed across one or both parallel channels to aerate the mixed liquor and propel the mixed liquor around the circuit. An imperforate horizontal baffle 62 extends under the brush aerator and is supported above the tank bottom 12 by struts 63 which do not impede the flow of an anoxic zone flow of mixed liquor under the baffle. As in the earlier described embodiments an upper aerobic zone is formed above the baffle and an anoxic zone thereunder. Similarly, the free interface downstream of the brush aerator and baffle allow for introduction of nitrates formed in and BOD from the aerobic zone to the anoxic zone without introduction of DO. Further, it is contemplated that other aeration means such as rotating discs or jet aerators may be utilized to aerate and propel the mixed liquor around the orbital circuit.

Figure 8:
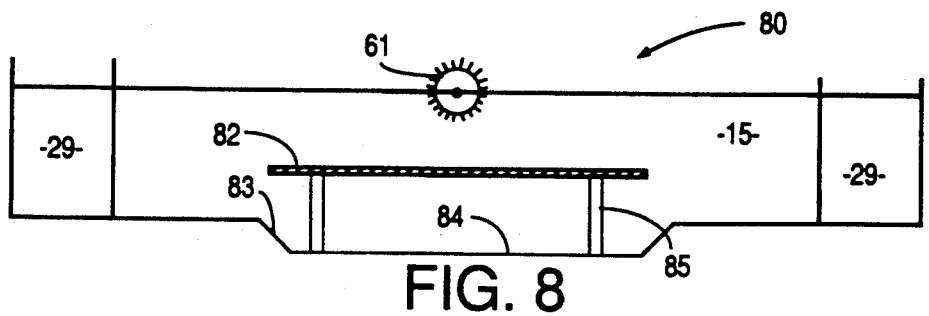
FIG. 8 is a cross-sectional view of a fifth embodiment.

FIG. 8 shows a further variant of the invention in which system 80 includes a sump 84 formed by sloped bottom walls 83 extending below baffle 82 and brush aerator 61, for the same purposes as set forth above with respect to the FIG. 5 embodiment. Struts 85 support baffle 82 and do not impede the anoxic zone flow under baffle 82.

The above described systems may be utilized to practice the method of the present invention. The method of treating wastewater mixed liquor containing a biomass comprises the steps of a) circulating mixed liquor in an orbit around a closed loop tank; b) aerating an upper layer of the mixed liquor with an aeration device to form an aerobic upper zone in said tank; c) oxidizing the mixed liquor in the aerobic upper zone by aerobic respiration of the biomass; d) sealing off a portion of said closed loop tank with a baffle under said aeration device to create an anoxic lower zone under the aeration device and extending partially around the closed loop tank; e) intermixing mixed liquor from the aerobic upper zone including $NO_x$ produced in the aerobic upper zone with mixed liquor in the anoxic lower zone at a position in said closed loop tank spaced from the baffle; and f) reducing the $NO_x$ content in the mixed liquor in the anoxic lower zone by anoxic respiration of the biomass. The method also entails introducing BOD from the upper aerobic zone to the lower anoxic zone or introducing a stream of BOD containing wastewater into the anoxic zone directly. Further, the method includes the step of preventing the flow of dissolved oxygen from the aerobic zone to the anoxic zone in an amount which would otherwise affect the anoxic characteristic of the anoxic zone. Additionally, the practice of the method includes the step of transferring the resultant low $NO_x$ mixed liquor from the anoxic zone to discharge.

The above description of embodiments of this invention is intended to be illustrative and not limiting. Other embodiments of this invention will be obvious to those skilled in the art in view of the above disclosure.

We claim:

1. A wastewater orbital treatment system comprising:
   an orbital tank for holding a moving volume of mixed liquor including a biomass, said tank including a curved turning wall and a partition wall extending short of the curved turning wall and forming at least a pair of parallel channels for mixed liquid transport and treatment;
   aeration means positioned in said tank for aerating and moving at least one upper portion of said moving volume to form at least one upper aerobic zone in said upper volume portion including dissolved oxygen allowing for BOD and ammonia oxidation and $NO_x$ production by aerobic respiration by the biomass;
   means in said tank for moving at least one lower portion of said moving volume to form at least one lower anoxic zone in said lower volume portion allowing for $NO_x$ reduction by anoxic respiration by the biomass;
   an essentially horizontal substantially imperforate baffle juxtaposed below the aeration means in such a manner as to essentially inhibit transfer of dissolved oxygen to said at least one anoxic zone, said baffle extending along a portion of said channels at an essentially horizontal interface between said at least one aerobic zone and said at least one anoxic zone; and
   means for permitting a degree of intermixing of $NO_x$ from said at least one aerobic zone to said at least one anoxic zone in a remaining portion of said channels.

2. The treatment system of claim 1 in which said aeration means comprises a vertical surface aerator.

3. The treatment system of claim 2 in which said means for moving a lower portion of said moving volume comprises a submerged propulsor.

4. The treatment system of claim 3 in which said propulsor is a radial impeller.

5. The treatment system of claim 4 in which said surface aerator and said radial impeller are driven by a common vertical rotative shift positioned adjacent to an end of said partition wall.

6. The treatment system of claim 1 in which said baffle extends upstream and downstream from said aeration means over a total distance of from about 20% to about 50% of the overall length of the tank.

7. The treatment system of claim 1 in which said aeration means further provides a frictional interlayer interface drag between said at least one aerobic zone and said at least one anoxic zone functioning as the said means for moving the at least one lower volume portion of said moving volume.

8. The treatment system of claim 1 in which said aeration means is a surface aerator spacedly positioned between an end of said partition wall and said turning wall, and said horizontal baffle extends from said turning wall to said partition wall inboard of said end of the said partition wall, said horizontal baffle spacedly extending above a tank bottom surface.

9. The treatment system of claim 1 wherein said tank includes a horizontal tank bottom extending from said turning wall and under said channels.

10. The treatment system of claim 9 wherein said tank bottom includes a tank bottom depression under said horizontal baffle and said aeration means.

11. The treatment system of claim 1 in which said aeration means comprises a horizontal brush aerator extending across at least one of said channels and said horizontal baffle extends under and up-stream and down-stream of said brush aerator.

12. The treatment system of claim 11 further including a tank bottom depression extending under said horizontal baffle.

13. In a wastewater orbital treatment system having an elongated tank, a vertical partition forming a continuous orbital channel in said tank and an aerator means for aerating and moving a mixed liquor including a biomass through said channel, the improvement comprising:
   a horizontal generally imperforate baffle below said aeration means and extending along a portion of said channel upstream and downstream of said aeration means,
   said baffle being sized and positioned to form an aerobic zone in and along an upper depth portion of said channel, to form an anoxic zone in and along a lower depth portion of said channels, and to provide intermixing of said mixed liquor flowing from the upper depth portion and lower depth portion along a remaining portion of said channel.

14. The treatment system of claim 13 wherein said aeration means comprises a vertical surface aerator.

15. The treatment system of claim 13 wherein said aeration means includes a vertically depending radial impeller for moving said mixed liquor along said anoxic zone in said channel.

16. The treatment system of claim 13 in which said aeration means comprises a horizontal brush aerator extending across said channel.

17. A method of treating a wastewater mixed liquor containing a biomass, comprising:
   circulating mixed liquor in an orbit around a closed loop tank;
   aerating an upper layer of the mixed liquor with an aeration device to form an aerobic upper zone in said tank;
   oxidizing the mixed liquor in the aerobic upper zone by aerobic respiration of the biomass;
   sealing off a portion of said closed loop tank with an essentially horizontal and substantially imperforate baffle under said aeration device to create an anoxic lower zone under the aeration device and extending partially around the closed loop tank;
   intermixing mixed liquor from the aerobic upper zone including $NO_x$ produced in the aerobic upper zone with mixed liquor in the anoxic lower zone at a position in said closed loop tank spaced from the baffle; and
   reducing the $NO_x$ content in the mixed liquor in the anoxic lower zone by anoxic respiration of the biomass.

18. The method of claim 17 further including introducing BOD to the anoxic lower zone.

19. The method of claim 18 wherein the step of reducing $NO_x$ content forms nitrogen gas and said nitrogen gas escapes at the surface of said closed loop tank.

20. The method of claim 17 further including the step of transferring a portion of BOD from the aerobic zone to the anoxic zone.

21. The method of claim 17 further including the step of introducing a BOD-containing wastewater into the anoxic zone.

22. The method of claim 17 further including the step of transferring low $NO_x$ mixed liquor from the anoxic zone to discharge.

* * * * *